United States Patent
Muraguchi et al.

(10) Patent No.: US 10,358,353 B2
(45) Date of Patent: Jul. 23, 2019

(54) METHOD FOR PRODUCING DISINTEGRATED SILICA PARTICLES

(71) Applicant: JGC Catalysts and Chemicals Ltd., Kawasaki-shi (JP)

(72) Inventors: Ryo Muraguchi, Kitakyushu (JP); Miki Egami, Kitakyushu (JP); Mitsuaki Kumazawa, Kitakyushu (JP); Masanobu Taniguchi, Kitakyushu (JP); Tsuguo Koyanagi, Kitakyushu (JP); Michio Komatsu, Kitakyushu (JP); Kazutaka Egami, Kitakyushu (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 728 days.

(21) Appl. No.: 14/908,621

(22) PCT Filed: Aug. 1, 2014

(86) PCT No.: PCT/JP2014/070389
§ 371 (c)(1),
(2) Date: Jan. 29, 2016

(87) PCT Pub. No.: WO2015/016359
PCT Pub. Date: Feb. 5, 2015

(65) Prior Publication Data
US 2016/0159654 A1    Jun. 9, 2016

(30) Foreign Application Priority Data

Aug. 1, 2013   (JP) ................................ 2013-160717
Nov. 19, 2013  (JP) ................................ 2013-238810
Jun. 16, 2014  (JP) ................................ 2014-123286

(51) Int. Cl.
C01B 33/18       (2006.01)

(52) U.S. Cl.
CPC ................................... *C01B 33/18* (2013.01)

(58) Field of Classification Search
CPC ............................... C01B 33/00; C01B 33/18
See application file for complete search history.

(56) References Cited

U.S. PATENT DOCUMENTS 5,503,932 A   4/1996   Sakai et al.
5,580,619 A   12/1996  Sakai et al.
(Continued)

FOREIGN PATENT DOCUMENTS

CN   1186772 A    7/1998
CN   1422805 A    6/2003
(Continued)

OTHER PUBLICATIONS

JP2012-227448, Ono et al ,2012, machine translation.*
(Continued)

*Primary Examiner* — Melvin C. Mayes
*Assistant Examiner* — Smita S Patel
(74) *Attorney, Agent, or Firm* — The Webb Law Firm

(57) ABSTRACT

Silica particles calcined in a calcination step are supplied in a swirling flow generated by a gas introduced in a disintegration container and disintegrated therein, whereby the silica particles can be easily disintegrated and there can be obtained disintegrated silica particles having both low hygroscopicity and high dispersibility in resin. In addition, the introduction of dehumidified air (gas) during the disintegration reduces hygroscopicity and greatly improves dispersibility in resin. Furthermore, performing heating treatment (calcination) again after the disintegration causes the surface modification of the disintegrated silica particles, greatly improving hygroscopicity and dispersibility in resin. The resin composition obtained in this manner including silica particles provides good injectability and filterability (Continued)

when used for an underfill material for semiconductors and an in-plane spacer or sealing spacer of liquid crystal displays.

17 Claims, 2 Drawing Sheets

(56) References Cited

U.S. PATENT DOCUMENTS

| | | | |
|---|---|---|---|
| 5,670,257 | A | 9/1997 | Sakai et al. |
| 6,359,667 | B1 | 3/2002 | Koyanagi et al. |
| 2003/0031615 | A1 | 2/2003 | Satou et al. |
| 2003/0069347 | A1 | 4/2003 | Oishi et al. |
| 2005/0126439 | A1 | 6/2005 | Satou et al. |
| 2007/0160520 | A1 | 7/2007 | Oishi et al. |
| 2010/0022694 | A1 | 1/2010 | Meyer et al. |
| 2012/0308824 | A1 | 12/2012 | Matsukubo et al. |

FOREIGN PATENT DOCUMENTS

| | | | |
|---|---|---|---|
| CN | 102725230 A | | 10/2012 |
| JP | 6296313 A | | 5/1987 |
| JP | 6345114 A | | 2/1988 |
| JP | 1234319 A | | 9/1989 |
| JP | 1259172 A | | 10/1989 |
| JP | 2311310 A | | 12/1990 |
| JP | 431311 A | | 2/1992 |
| JP | 7140472 A | | 6/1995 |
| JP | 10324517 A | | 12/1998 |
| JP | 11228698 A | | 8/1999 |
| JP | 11228699 A | | 8/1999 |
| JP | 2003176121 A | | 6/2003 |
| JP | 2004203729 A | | 7/2004 |
| JP | 2010137189 A | | 6/2010 |
| JP | 2011245362 A | | 12/2011 |
| JP | 2012142438 A | | 7/2012 |
| JP | 2012227448 A | | 11/2012 |
| JP | 2013126925 A | | 6/2013 |
| TW | 200837013 B | | 4/2012 |
| WO | 9926881 A1 | | 6/1999 |

OTHER PUBLICATIONS

JP2010-324517, Ono et al, 2010, machine translation.*
jph01-259172, Toshimichi et al, 1989, machine translation.*
jph0431311, Toshio et al, 1992, machine translation.*
Ming, Fang, "Preparing the nano SiO2, surface modification and application prospects", 2011, pp. 19-23, China Academic Journal Electronic Publishing House.

* cited by examiner

[Fig. 1]
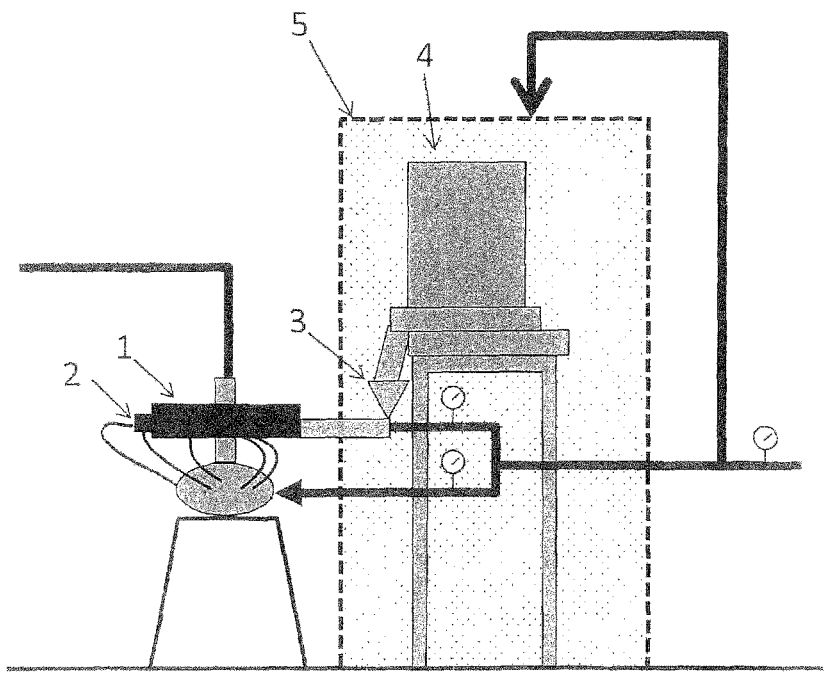
[Fig. 2A]
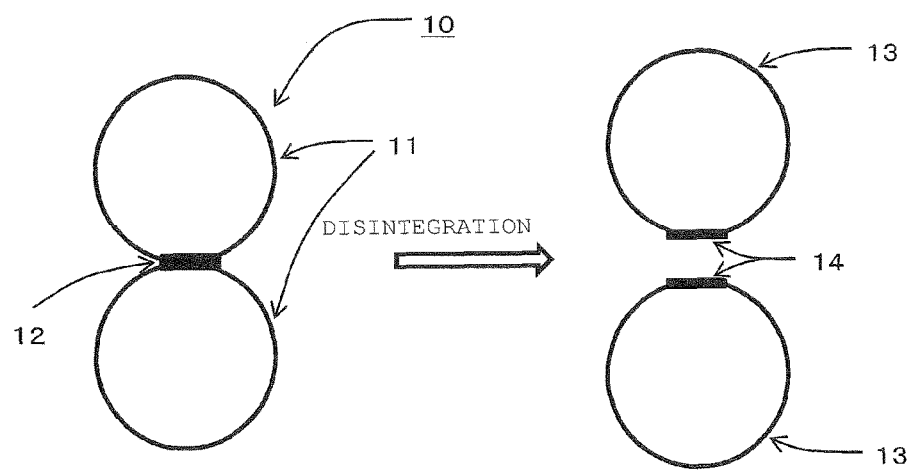

[Fig. 2B]
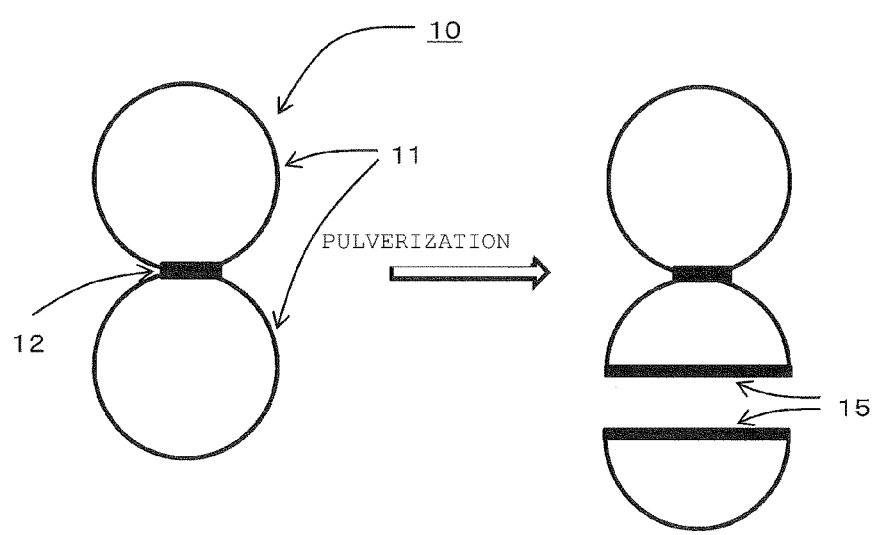

METHOD FOR PRODUCING DISINTEGRATED SILICA PARTICLES

CROSS-REFERENCE TO RELATED APPLICATIONS

This application is the United States national phase of International Application No. PCT/JP2014/070389 filed Aug. 1, 2014, and claims priority to Japanese Patent Application Nos. 2013-160717, 2013-238810, and 2014-123286, filed Aug. 1, 2013, Nov. 19, 2013, and Jun. 16, 2014, respectively, the disclosures of which are hereby incorporated in their entirety by reference.

TECHNICAL FIELD

The present invention relates to a method for producing disintegrated silica particles and to a resin composition including the particles. In particular, the invention relates to a method for producing disintegrated silica particles having low hygroscopicity and high dispersibility in resin. The present invention further relates to a resin composition including disintegrated silica particles, which provides good injectability and filterability when used for an underfill material for semiconductors and an in-plane spacer or sealing spacer of liquid crystal displays.

BACKGROUND ART

Spherical silica particles are used in a variety of purposes. For example, Patent Literature 1 (Japanese Unexamined Patent Application Publication No. H07(1995)-140472) describes the production of spacer particles for liquid crystal cells by heating treatment (at from 100 to 1000° C.) of particles obtained from the hydrolysis and poly-condensation of an organic silicon compound. In addition, Patent Literature 2 (Japanese Unexamined Patent Application Publication No. H11(1999)-228699) and Patent Literature 3 (Japanese Unexamined Patent Application Publication No. H11(1999)-228698) report that silica particles obtained from the hydrolysis and condensation of an organic silicon compound are calcined at high temperature and the calcined silica particles are used for an in-plane spacer or a sealing spacer of liquid crystal displays.

In addition, calcined silica particles are added as a filling agent or filler in resin compositions. For example, it is known that calcined silica particles are added as a filling agent in curable resin compositions used as sealing materials of semiconductor devices and dental materials. Calcined silica particles are required to have low hygroscopicity, a narrow particle size distribution with a uniform particle size, high dispersibility, and the like. For example, Patent Literature 4 (Japanese Unexamined Patent Application Publication No. 2012-142438) discloses a paste used for mounting semiconductor elements, which includes polyorganosiloxane particles having a mean particle size from 0.5 to 30 μm and a coefficient of particle size variation (CV value) of 3% or less and resin.

In addition, Patent Literature 5 (Japanese Unexamined Patent Application Publication No. S62(1987)-96313) and Patent Literature 6 (Japanese Unexamined Patent Application Publication No. H01(1989)-234319) disclose that silica particles obtained by condensation of a hydrate are uniform in particle size and therefore suitable as a filler or the like.

Patent Literature 7 (Japanese Unexamined Patent Application Publication No. 2003-176121) discloses calcined silica particles having a mean particle size in a predetermined range and thus having a small standard deviation of the mean particle size, containing few agglomerates thereof, and having low hygroscopicity. Specifically, silica particles are made by hydrolyzing and condensing a hydrolyzable silicon compound in an organic solvent including water and a catalyst. After these silica particles are spray dried, the silica particles are calcined in a range of 1000 to 1200° C. In this case, since the silica particles are dried in an agglomeration state, when the silica particles are calcined, they will be progressively fused to form agglomerates, monodispersed paericles are not obtained. Owing to this, the silica particles, after being spray dried, are pulverized using a pulverizer such as a hammer mill (a pulverization step), resulting in pulverizing the agglomerates and suppressing the agglomeration during the calcination of the silica particles.

In addition, Patent Literature 8 (Japanese Unexamined Patent Application Publication No. 2011-245362) discloses a jet mill in which a high pressure gas is introduced in a truly circular chamber to concentrically generate a swirling flow running along an inner wall surface of the chamber, whereby raw material particles are caused to collide with each other to be pulverized and powdered.

CITATION LIST

Patent Literature

[Patent Literature 1] Japanese Unexamined Patent Application Publication No. H07(1995)-140472
[Patent Literature 2] Japanese Unexamined Patent Application Publication No. H11(1999)-228699
[Patent Literature 3] Japanese Unexamined Patent Application Publication No. H11(1999)-228698
[Patent Literature 4] Japanese Unexamined Patent Application Publication No. 2012-142438
[Patent Literature 5] Japanese Unexamined Patent Application Publication No. S62(1987)-96313
[Patent Literature 6] Japanese Unexamined Patent Application Publication No. H01(1989)-234319
[Patent Literature 7] Japanese Unexamined Patent Application Publication No. 2003-176121
[Patent Literature 8] Japanese Unexamined Patent Application Publication No. 2011-245362

SUMMARY OF INVENTION

Technical Problem

For the following reasons, however, the particles obtained by any of the methods are inadequate as particles to be used for underfill materials or sealing materials. While there are various methods for preparing silica particles, it is not very easy to prevent agglomeration and enhance dispersibility in resin. This problem is more significant for a smaller particle size in particular, because it results in a larger surface area for particles. Calcination of agglomerated silica particles at high temperature causes fusion between the silica particles, leading to insufficient dispersibility. Silica particles produced using a spray dryer, as in Patent Literature 5 and 6, agglomerate and cause insufficient dispersibility in resin, and the like. In addition, although it is empirically known, as in Patent Literature 7, that refinement based on calcination at a relatively high temperature of 1000 to 1200° C. lowers the hygroscopicity of the particles, a higher treatment temperature causes more fusion between the silica particles, which result in primary particles coalesced into agglomerates. Pulverization before calcination can make it less likely for agglomerates to occur, but may not prevent the particles from being fused. As a result, agglomerates will occur and worsen injectability and embeddability into narrow gaps, and filterability of kneaded materials made by kneading the particles and a resin.

Furthermore, in such a case, the fused or coalesced particles are treated with a pulverizer empirically, but the pulverized surface of the pulverized particles has siloxane bonds broken and thus is prone to produce silanol groups and result in a hydrophilic surface. The surface refined through calcination has few silanol groups and is hydrophobic but when pulverization breaks the siloxane bonds and causes silanol groups to occur, the hydrophobic surface will be reduced and the hydrophilic enlarged. This is likely to cause primary particles to be loosely associated into agglomerates (lumps) and result in insufficient dispersion when kneaded with a resin component later, causing reduced filterability and reduced injectability.

Calcining particles at a low temperature of below 900° C. is effective to prevent the fusion between the particles. However, the calcination of silica particles at low temperature tends to cause silanol groups to be left on the surface of the calcined silica particles and thus hygroscopicity cannot be reduced.

In addition, the use of the device shown in Patent Literature 8 allows powdering by pulverization but does not allow adequate control of the hydrophilic surface and the hydrophobic, and then results in reduced dispersion in resin, occurrence of agglomerates, and reduced filterability of resin-kneaded materials.

Thus, conventional production methods do not allow the low hygroscopicity and high dispersibility of calcined silica particles to be compatible with the filterability and injectability of a resin composition.

Solution to Problem

Accordingly, it is an object of the present invention to provide particles having a uniform particle size, low hygroscopicity, and high dispersibility in resin. In order to achieve the above object, the present invention employs the calcined silica particles calcined at from 600 to 1200° C. in a calcination step, which are supplied and disintegrated in a swirling flow generated by a gas introduced in a disintegration container. According to such a method, the particles can be relatively easily disintegrated and separated into primary particles without being pulverized, and a hydrophilic surface is not easily generated. For this reason, obtainable disintegrated silica particles have low hygroscopicity and a low possibility of forming agglomerates, thereby providing high dispersibility in resin. As a result, the composition obtained by kneading with a resin component has good filterability and are excellent in injectability and embeddability into narrow gaps.

In order to enhance the dispersibility of the disintegrated silica particles, use of silica particles whose mean particle size is in a range of 1 to 100 μm and whose water content is in a range of 0.01 to 10% by mass is preferred. For example, spray dried silica particles obtained by spray drying a dispersion solution of silica particles in a mean particle size range of 10 nm to 1 μm are suitable. The silica particles to be spray dried preferably have a uniform particle size distribution so that it can give a uniform packing property of the spray dried particles. If silica particles including distributed small particles are used to be spray dried, they tend to provide spray dried particles having a high packing property and increase contacts between the particles, resulting in increased fusion points in a calcination step, which make the particles more difficult to disintegrate, leading to lowered dispersibility in resin. If the water content of silica particles used for spray drying is a predetermined amount, obtained disintegrated silica particles have a small amount of silanol groups overall, and the moisture absorption amount and dispersibility in resin can be within a predetermined range.

It is preferred that a spray velocity at the nozzle in a disintegration step should be subsonic or greater and that a linear velocity of a swirling flow should be heightened.

Moreover, in a disintegration step, by limiting a supply amount (solid to gas ratio) of calcined silica particles (solid) supplied into a swirling flow (gas) to a predetermined range, disintegrated silica particles in a mean particle size range of 5 nm to 0.95 μm can be efficiently obtained.

Additionally, it is preferred that dehumidified air (gas) should be introduced in the disintegration step, whereby generation of silanol groups is suppressed, hygroscopicity is further reduced, and dispersibility in resin is significantly improved.

Furthermore, it is preferred that heating treatment (calcination) should be performed again after the disintegration, whereby the surface of the disintegrated silica particles is modified, hygroscopicity is significantly reduced, and dispersibility in resin is significantly improved.

In addition, it is more preferred that the calcination step should be a step of calcining silica particles at from 800 to 1000° C. in an atmosphere of an absolute humidity of 50 g/m$^3$ or more (alternative calcination step). The invention has found that calcining silica particles in such a humidified atmosphere reduces hygroscopicity even when calcining at a relatively low temperature. Furthermore, it is preferred that, after the calcination in the humidified atmosphere, an inert gas having a dew point of 0° C. or less should be injected in the calcination furnace to discharge water vapor-containing air.

A resin composition according to the present invention includes disintegrated silica particles obtained by any of the methods for producing disintegrated silica particles described above, and resin. In such a resin composition, since the disintegrated silica particles are uniformly dispersed, injectability and filling ability are excellent even in narrow gaps, and the composition is not hygroscopic even after curing, so that highly reliable electronic devices or the like can be obtained. Preferably, the resin is one or two or more selected from epoxy-based resins, polyimide-based resins, bismaleimide-based resins, acrylic resins, methacrylic resins, silicon-based resins, BT resins, and cyanate-based resins. In addition, preferably, a content of the disintegrated silica particles is in a range from 5 to 75% by mass.

Advantageous Effects of Invention

The present invention can provide disintegrated silica particles having a uniform particle size, low hygroscopicity, and high dispersibility in resin, and a resin composition having good injectability and filterability when used for an underfill material for semiconductors and an in-plane spacer or sealing spacer of liquid crystal displays.

BRIEF DESCRIPTION OF DRAWINGS

FIG. 1 is a model diagram depicting an embodiment of a disintegration apparatus used in the present invention.

FIG. 2A is a schematic diagram illustrating the disintegration.

FIG. 2B is a schematic diagram illustrating the pulverization.

DESCRIPTION OF EMBODIMENTS

[Method for Producing Disintegrated Silica Particles]

A method for producing disintegrated silica particles according to the present invention has a calcination step of calcining silica particles at from 600 to 1200° C. to produce calcined silica particles and a disintegration step in which disintegrated silica particles are produced by supplying and disintegrating a predetermined amount of the calcined silica particles in the swirling flow generated by a gas introduced in a disintegration container at a predetermined velocity (linear velocity). According to such a method, the calcined silica particles can be disintegrated into primary particles without being fractured. Since the disintegrated surface has no silanol groups generated thereon unlike a fractured surface, the disintegrated silica particles have low hygroscopicity and a low possibility of forming agglomerates. For this reason, the dispersibility in resin is high, and as a result, the composition obtained through kneading with a resin component has good filterability and are excellent in injectability and embeddability into narrow gaps.

There are no particular limitations to a method for producing silica particles to be used in a calcination step. However, silica particles by which calcined silica particles having high dispersibility in resin can be obtained are preferable.

Herein, in order to distinguish between the silica particles before and after the disintegration step, silica particles after the calcination step (before the disintegration step) are called calcined silica particles, and those after the disintegration step are called disintegrated silica particles.

(Calcination Step)

In the calcination step, silica particles produced by a variety of methods are calcined at from 600 to 1200° C. Through calcination, silica particles (primary particles) are fused at the neck portions, and they agglomerate further, turning into particle aggregates. Here, if the calcination temperature is less than 600° C., refinement of obtainable particles (calcined silica particles) does not sufficiently progress, and their hygroscopicity is high. Thus, resin compositions including such silica particles have high hygroscopicity even after curing and therefore cannot be sufficiently reliable. On the other hand, calcination temperatures exceeding 1200° C. tend to cause the sintering of particle aggregates of the silica particles. Thus, it is difficult to disintegrate the particles into the original particle size in the disintegration step (i.e. to restore them to primary particles). Usually, calcination can be performed in air atmosphere, and in cooling after the calcination, a gas atmosphere having a dew point of 0° C. or less is preferable to prevent moisture absorption caused by dew condensation. A gas atmosphere having a dew point of −10° C. or less is more preferable.

(Disintegration Step)

In the disintegration step, a gas is introduced in the disintegration container to generate a swirling flow, and then calcined silica particles obtained in the calcination step are supplied in the swirling flow. In this way, the particle aggregates of the calcined silica particles are disintegrated into silica particles having the same particle size as before the calcination, without being fractured. Thus, disintegrated silica particles are obtained.

Now, FIG. 2A illustrates a state of disintegration schematically. When those particle aggregates of the calcined silica particles which are obtained in the calcination step are supplied and disintegrated in the uniform swirling flow, the contact portions of the particle aggregates are separated to provide the calcined silica particles 10. Further, the neck portions 12 which are the fusion portions of the calcined silica particles 10 are cleaved to provide the disintegrated silica particles 13 dispersed in the primary particles. Next, FIG. 2B illustrates a state of fracture schematically. Pulverization of the calcined silica particles 10 using a conventionally employed pulverization apparatus that generates no swirling flow, such as a hammer mill, causes collisions between the calcined silica particles 10 and the wall of a container and hummer or collisions between the particles to fracture the particles, generating the fractured surfaces 15 which are activated surfaces (see FIG. 2B). On this fractured surface 15, silanol groups are likely produced because the siloxane bonds of the particles are broken. As a result, the fractured surface 15 is a hydrophilic surface, and its hygroscopicity cannot be lowered.

Compared to this, the disintegrated silica particles 13 obtained by disintegration using a uniform swirling flow are based on disintegration caused by shear in the swirling flow, not by collisions between the particles, because of which fractured surfaces are less likely produced. In addition, the separated surface 14 produced when the particles are cleaved at the fused portions (neck portions) has a smaller area than the fractured surface even when the separated surface is activated by a force of disintegration. Because of this, disintegration in the swirling flow allows the hydrophilicity and hydrophobicity on the particle surface to be controlled, lowers hygroscopicity, unlikely generates agglomerates, and provides the disintegrated silica particles 13 which are highly dispersible.

In this regard, as an introduction gas, air, gaseous oxygen, an inert gas and the like can be used. Air is recommended in terms of safety and economy. Furthermore, the gas to be introduced in the disintegration container preferably has a dew point of 0° C. Gases having a dew point exceeding 0° C. tend to generate moisture-based silanol groups on an active surface created on the disintegrated silica particles by disintegration. Long-hour exposure of a cured product obtained from a resin composition including disintegrated silica particles with silanol groups to outside air causes the product to absorb moisture, so that the product cannot be sufficiently reliable. Due to such a reason, the dew point of the introduced gas is preferably −10° C. or less, and more preferably −20° C. or less. Introduced gases having a dew point of 0° C. or less can be prepared by known methods such as an adsorption-removal method by compress gas, an air drier, or an adsorbent. Temperature during the disintegration is not limited as long as no dew condensation is caused. In this regard, dry steam can be used for the purposes of increasing the ratio of lone silanol groups.

In addition, preferably, the pressure of the introduced gas is in a range from 0.1 to 1.5 MPa. Pressures of the introduced gas below 0.1 MPa can make the swirling velocity of the gas insufficient, leading to insufficient disintegration. Pressures thereof exceeding 1.5 MPa can cause not only the disintegration of particle aggregates but also increased collisions between the particles, with the fear that particle fracture may occur. Therefore, more preferably, the pressure of the introduced gas ranges from 0.1 to 1.0 MPa, where the high level side of the pressure range is suppressed. Additionally, due to the Joule-Thomson effect by the latent heat of expansion, temperature is locally lowered and moisture can be adsorbed on the activated surface of particles. Accordingly, the introduction of gas at an inappropriate pressure makes it difficult to produce disintegrated silica particles having low hygroscopicity and high dispersibility in resin. In addition, the linear velocity of the introduced gas is preferably subsonic or greater, more preferably transonic to supersonic. When the linear velocity of the introduced gas is less than a subsonic velocity, the disintegration may be insufficient because the swirling velocity is insufficient. And, at above a supersonic, not only disintegration of particle aggregates but also increased collisions between the particles may occur, resulting in fractured particles. Meanwhile, the linear velocity of the introduced gas can be calculated from the pressure of the introduced gas.

Furthermore, the quantitative ratio (solid to gas ratio: g/m$^3$) of the calcined silica particles and the introduced gas which are supplied into the swirling flow, based on a certain volume of a pulverization chamber, is preferably 4.4 to 36.3 g/m$^3$, more preferably 6.6 to 30.3 g/m$^3$. When the solid to gas ratio is less than 4.4 g/m$^3$, the supply of the calcined silica particles can be unstable, and when it is greater than 36.3 g/m$^3$, the disintegration can be insufficient.

The solid to gas ratio can be calculated as a ratio between a supply amount of the calcined silica particles (solid) and a gas volume of the introduced gas (gas), per unit time (solid (g/Hr)/gas (m$^3$/Hr)). If the swirling flow is maintained and the pulverization chamber volume/the solid to gas ratio is maintained, the size of a pulverization chamber is not limitative.

FIG. 1 is a model diagram depicting a disintegration apparatus suitable to the present invention. Calcined silica particles are supplied in a disintegration container 1 from the introduction inlet 3 provided on the disintegration apparatus 1. The introduction inlet 3 and the storage unit 4 for the calcined silica particles are in the single sealed space 5, and the sealed space 5 is preferably filled with an introduced gas. And the introduced gas flows into the container through the gas introduction portion 2.

A disintegration apparatus for disintegration using the swirling flow generated with high pressure gas includes the Nano Jetmizer series from Aishin Nano Technologies Co., Ltd., the Nano Grinding Mill series from Sunrex-Kogyo Co., Ltd., or the like.

A suitable material of an inner surface of the disintegration container 1 is silicon carbide (SiC). Particularly, an SiC that has been calcined at 900° C. or more is preferably used. The use of the disintegration container 1 whose inner surface is made of SiC allows the production of disintegrated silica particles containing no impurities such as zirconium (Zr), iron (Fe), uranium (U), and thorium (Th). Therefore, there can be obtained highly reliable electronic devices (such as semiconductor chips and liquid crystal sealing materials).

Disintegrated silica particles thus prepared have a mean particle size ranging preferably from 5 nm to 0.95 μm, and more preferably from 20 nm to 0.95 μm. Mean particle sizes of the disintegrated silica particles below 5 nm can lead to insufficient dispersibility in resin, and mean particle sizes thereof exceeding 0.95 μm can lead to the degradation of filling ability due to narrow gaps when used in highly integrated semiconductor devices or the like.

Additionally, the disintegrated silica particles are preferably uniform in particle size. Specifically, the particles have a coefficient of particle size variation (CV value) ranging preferably from 1 to 50%, and more preferably from 1 to 45%. It is difficult for those having a mean particle size in the above range to achieve a CV value below 1%, and even if possible, it is necessary to precisely adjust various conditions for particle preparation, thus reducing productivity and economic efficiency. The particles having a CV value exceeding 50% cause the degradation of injectability and filling ability in narrow gaps. When the obtained CV value is not in the appropriate range, disintegration or the removal of coarse particles can be performed to obtain an intended CV value.

Coefficient of particle size variation (CV value) can be calculated by the following formula (2):

[Math. 1]

$$CV \text{ value} = \text{(particle size standard deviation } (\sigma)/\text{mean particle size } (Dx)) \times 100 \quad (2)$$

$$\text{Particle size standard deviation } (\sigma) = \sqrt{\frac{\Sigma(Di - D_x)^2}{n-1}}$$

Di: Particle size of individual particles n: 250

The mean particle size used to obtain the coefficient of particle size variation (CV value) is obtained by photographing an image through a scanning electron microscope (Model: JSM-5300, manufactured by JEOL Ltd.) and performing the particle size measurements of 250 particles in the image using an image analyzer (IP-1000, manufactured by Asahi Kasei Corporation).

In addition, disintegrated silica particles sometimes include coarse particles having a particle size four times the mean particle size. Preferably, the percentage of the coarse particles is 5% by mass or less. The presence of coarse particles exceeding 5% by mass leads to the reduction of dispersibility in resin, and the resin composition can cause the degradation of injectability and filling ability depending on the particle size. More preferably, the percentage of the coarse particles is 2% by mass or less.

Additionally, preferably, the disintegrated silica particles have a moisture content of 0.2% by mass or less. Moisture contents of the disintegrated silica particles exceeding 0.2% by mass reduce dispersibility in resin and facilitate the moisture absorption of a cured product obtained by curing a resin composition including the particles, so that electronic devices or the like can be less reliable. More preferably, the moisture content of the disintegrated silica particles is 0.15% by mass or less.

The moisture content is obtained as follows. The calcined silica fine particles (B1) having a mass ($W_D$) are exposed to an environment with a temperature of 25° C. and a humidity of 90%, and a mass ($W_H$) of the particles after 48 hours was measured. Then, moisture content (% by mass) is represented by the following equation:

$$((W_H) - (W_D))/(W_D) \times 100.$$

(Surface Modification Step)

Disintegrated silica particles obtained by the disintegration step described above can be used directly in a resin composition, but is preferably subjected to surface modification. Specifically, following the disintegration step, the particles are heated at from 500 to 1100° C. The disintegration step cleaves the fusion portions of the particles to cause the active surface thereof to appear and thereby silanol groups are generated on the active surface. However, heating treatment at 500° C. or more causes the active surface to be transformed from silanol groups toward siloxane bond, so that moisture absorption of the surface can be prevented. Temperatures of heating treatment below 500° C. may allow the active surface to be temporarily transformed toward siloxane bond, but tends to cause silanol groups to be generated by rehydration. As a result, there cannot be obtained disintegrated silica particles having low hygroscopicity and high dispersibility in resin. This is the same also in a resin composition including particles having an exposed active surface. Heating temperatures below 500° C. make it difficult to transform silanol groups of the active surface toward siloxane, thus resulting in the generation of silanol groups on the surface during use. On the other hand, heating temperatures exceeding 1100° C. can cause the re-agglomeration or re-fusion of disintegrated particles.

In addition, preferably, the heating treatment is performed in an atmosphere of air, oxygen gas, an inert gas, or the like. Particularly, it is preferable to use a gas atmosphere having a dew point of 0° C. or less during cooling after the surface modification step.

Providing the surface modification step using a heat treatment temperature from 800 to 1100° C. allows the production of disintegrated silica particles having low hygroscopicity and high dispersibility in resin even when the temperature of the calcination step is in a relatively low temperature range from 600 to 1000° C.

(Classification Step)

After the disintegration step or the surface modification step, a classification step may be performed. It is preferred that the disintegrated silica particles obtained by the disintegration step (or the surface-modified disintegrated silica particles obtained by the surface modification step) should be classified using a classification device, that coarse particles having a particle size equal to or greater than four times the mean particle size should be removed, and that the percentage of the coarse particles should be 5% by mass or less. More preferably, it is 2% by mass or less. In addition, by using a classification device, more disintegrated silica particles having the mean particle size within a predetermined range can be obtained (in other words, the CV value can be made low). For this step, a classification device such as from Donaldson Company, Inc., Spin Air Sieve from Seishin Enterprise Co., Ltd., Aerofine Classifier from Nisshin Engineering Inc., Powder Systems Classifier from Powder Systems Co., Ltd., or Twin Turboplex from Hosokawa Micron Corporation can be used.

(Alternative Calcination Step)

Alternatively, the calcination step described above may be set as follows. Specifically, silica particles are calcined at from 800 to 1000° C. in the presence of 50 g/m³ or more of water vapor, thereby producing calcined silica particles. Such a calcination step can reduce hydroxyl groups on the surface of the calcined silica particles, thus reducing the hygroscopicity of the calcined silica particles in spite of the calcination in the low temperature range. Particularly, it is preferable to calcine the silica particles while maintaining the amount of water vapor in the furnace at from 100 g/m³ to 2000 g/m³. When the amount of water vapor in the furnace is below 100 g/m³, the less amount thereof makes it difficult to promote the poly-condensation of silanol groups of the particles at low temperature, and thus many of the silanol groups in the particles tend to be left. On the other hand, it is economically not preferable to set the amount of water vapor in the furnace to be more than 2000 g/m³, since the poly-condensation of the silanol groups is not promoted more accelerately than that.

In addition, after this alternative calcination step, it is preferable to inject an inert gas having a dew point of 0° C. or less in the furnace to discharge water vapor in the furnace. This is because moisture can adhere to the calcined silica particles when water vapor is present during cooling. For example, it is effective to replace a gas containing the water vapor in the furnace by an inert gas having a dew point of 0° C. or less during the cooling of the calcined silica particles after the calcination step.

Herein, the method of the calcination is not particularly limited as long as the amount of water vapor is appropriately maintained. The method thereof can be rotation calcination, batch calcination, conveyor calcination, or the like. Water vapor may also be introduced as a gas in the furnace or may be introduced as liquid and then vaporized in the furnace.

In this manner, calcined silica particles having a mean particle size from 10 nm to 10 μm can be obtained from a dispersion solution of silica particles having the mean particle size from 10 nm to 10 μm. The calcination under conditions maintaining the amount of water vapor at from 100 g/m³ to 2000 g/m³ allows the reduction of silanol groups at low temperature as compared to calcination under conditions with the less amount of water vapor. Accordingly, there can be obtained calcined silica particles having low hygroscopicity and hardly causing moisture adsorption. Furthermore, due to the low temperature calcination, the obtained particles cause less particle fusion and have favorable dispersibility. On the other hand, it is difficult for calcined silica particles having a mean particle size of below 10 nm to have a uniform particle size. Even if possible, the large specific area of the particles having a mean particle size of below 10 nm easily causes strong sintering of the particles during calcination, as a result of which there cannot be obtained calcined silica particles having low hygroscopicity and high dispersibility in resin. Calcined silica particles having a mean particle size exceeding 10 μm can hardly be filled in narrow gaps and therefore are not suitable for a filling agent used in highly integrated semiconductor devices or the like.

As described above, the disintegrated silica particles obtained by the alternative calcination step cause less fusion and have higher dispersibility than those obtained by the calcination step described before that.

In addition, calcined silica particles sometimes contain coarse particles having particle sizes four times or more than a mean particle size. The percentage of the coarse particles is preferably 5% by mass or less, and particularly suitably 2% by mass or less. Percentages of the coarse particles exceeding 5% by mass reduce dispersibility in resin, as well as can degrade injectability and filling ability depending on the particle size.

For the same purpose as above, water content classification using a specific gravity difference, removal with a filter, or the removal of coarse particles by cyclone method may be used as needed.

[Production of Silica Particles]

Next, a detailed description will be given of silica particles to be used in the calcination step described above. The method for producing the silica particles is not limited as long as there can be obtained spherical calcined silica particles having a mean particle size in a range described later and high dispersibility in resin. For example, the silica particles may be silica particles obtained by hydrolysis of an organic silicon compound, which have been disclosed in Japanese Unexamined Patent Application Publication No. H11(1999)-228698, No. H11 (1999)-228699, or the like, or silica particles obtained by a method equivalent to the method of the above literature. Alternatively, the silica particles may be silica particles grown by adding, to seed particles, an active silicic acid solution obtained by dealkalization of water glass with an ion exchange resin, which have been disclosed in Japanese Unexamined Patent Application Publication No. S63(1988)-45114, No. 2004-203729, No. 2013-126925, or the like, or silica particles obtained by a method equivalent to the method of the above literature.

Herein, a description will be given of a method for preparing silica particles by hydrolyzing a hydrolyzable organic silicon compound represented by the following formula (1), next undergoing particle growth (Build up) to prepare a dispersion solution of silica particles, and then spray drying the solution.

(1)

(wherein each R represents a substituted or unsubstituted hydrocarbon group having 1 to 10 carbon atoms and may be the same as or different from each other; X represents an alkoxy group having 1 to 4 carbon atoms, a hydroxyl group, halogen, or hydrogen; and n represents an integer from 0 to 3).

(1) Seed Particle Preparation Step

First, a hydrolysis catalyst is added to a mixed solvent of water and alcohol to obtain a mixed solvent. To the obtained mixed solvent is added an organic silicon compound represented by the formula (1) to obtain a dispersion solution of silica fine particles (referred to also as seed particles) (a solution "A"). In other words, the silica seed particles are a hydrolysate of the organic silicon compound.

Preferably, the organic silicon compound is added to the mixed solvent in a short time as much as possible, and all at once if possible. The addition of the compound in a short time allows the production of seed particles having a uniform particle size. Performing particle growth of the seed particles in a particle growth step described later can result in the production of silica particles having a uniform particle size (with a small particle size variation coefficient).

Examples of the alcohol that can be used include methanol, ethanol, propanol, and butanol, and if needed, another organic solvent may be used together. In this case, preferably, a weight ratio of water to alcohol in the mixed solvent ranges from 1:1 to 3:1. When the weight ratio is in the range, there can be obtained relatively monodispersed silica seed particles, so that it is effective to produce silica particles having a uniform particle size.

Examples of the hydrolysis solvent that can be used include basic compounds such as alkali metal hydroxides and basic nitrogen compounds. Herein, ammonia is recommended. Ammonia is not only hydrolyzable but also useful for the adjustment of pH of a dispersion solution in each step, as well as no ammonia is left as an impurity in finally obtained disintegrated silica particles.

The concentration of the hydrolysis catalyst in the mixed solvent varies depending on the kinds of the hydrolysis catalyst and the organic silicon compound but is preferably in a range from 1 to 7.5% by mass. When the concentration of the hydrolysis catalyst is in the range, there can be obtained relatively monodispersed silica fine particles that are suitable as seed particles. In addition, more preferably, the concentration of the hydrolysis catalyst is from 3 to 5% by mass.

The concentration of the dispersion solution of the silica seed particles (the solution "A") is represented by "$R_n$—$SiO_{(4-n)/2}$" and preferably ranges from 0.01 to 5% by mass. Setting the concentration of the dispersion solution (the solution "A") in the above range allows the production of silica seed particles having a desired particle size. More preferably, the concentration thereof ranges from 0.1 to 1% by mass. In addition, the temperature of the dispersion solution (the solution "A") preferably ranges from 5 to 40° C., and the pH thereof preferably ranges from 8 to 13, and more preferably ranges from 10 to 12.

In this manner, setting the temperature and the pH in the appropriate ranges above allows the mean particle size of the silica seed particles to be controlled in a range from 5 nm to 0.8 μm and allows the standard deviation to be 0.5 μm or less.

Furthermore, preferably, a pH adjuster is added to the dispersion solution of the silica fine particles (the solution "A"). In the present embodiment, ammonia water is added, although water may be added as needed. As a result, there can be obtained a dispersion solution of the silica fine particles (a solution "B") having a pH from 10 to 13. Preferably, the dispersion solution of the silica fine particles (the solution "B") has a temperature ranging from 5 to 40° C. In addition, preferably, the dispersion solution has an electric conductivity ranging from 80 to 200 μS/cm. Setting the pH, temperature, and electric conductivity of the dispersion solution of the silica fine particles (the solution "B") to be in the above ranges allows the silica fine particles to have a more uniform particle size without causing agglomeration, so that the silica fine particles can be suitably used as seed particles.

(2) Particle Growth Step

Next, a particle growth step is performed. Specifically, the hydrolyzable organic silicon compound and the hydrolysis catalyst are consecutively or intermittently added to the dispersion solution of the silica fine particles (the solution "B"). Herein, preferably, the hydrolyzable organic silicon compound and the hydrolysis catalyst are simultaneously and consecutively added thereto. The simultaneous addition of both thereof allows the reduction of pH change in the dispersion solution during the particle growth step. Thus, the hydrolysis rate of the organic silicon compound for particle growth and the precipitation rate thereof on the surface of the silica fine particles (seed particles) become constant, whereby there can be obtained silica particles having a uniform particle size.

In this case, preferably, the amount of the organic silicon compound added ranges from 2 to 200 times the amount of "$R_n$—$SiO_{(4-n)/2}$" of the above dispersion solution (the solution "A"). When the amount thereof is in this range, silica particles having a mean particle size in the range from 10 nm to 1 μm described later can be obtained by monodispersion without causing agglomeration. More preferably, the amount of the organic silicon compound added ranges from 10 to 150 times the amount thereof. Silica particles having a mean particle size of 1 μm or more can be obtained by using the particles obtained herein as seed particles and then additionally performing the same particle growth step. In this way, the repetition of the particle growth step allows the silica particles to be grown up to a size of about 10 μm.

In this step, the time of addition of the organic silicon compound and the hydrolysis catalyst (ammonia water) varies depending on the amount of silica particles produced, but is from 1 to 48 hours, and particularly preferably from 2 to 24 hours. When the time of addition is in the above range, monodispersed silica particles can be produced without causing agglomeration. In addition, during the particle growth, the pH of the dispersion solution is set to be in a range from 8 to 13. The range of change of the pH is preferably ±1.0, and more preferably ±0.5.

Additionally, in this case, preferably, water is added in an amount from 4 to 200 moles per mole of silica fine particles ($SiO_2$), and particularly, an amount from 6 to 100 moles of water per mole thereof is suitably added. Addition of water below 4 moles hardly causes hydrolysis and thus no spherical particles may be obtainable. Addition of water more than 200 moles increases the hydrolysis rate, so that self-nucleation can occur without particle growth. Furthermore, preferably, the hydrolysis catalyst is added so as to be present in an amount from 0.5 to 7.5% in the system, although depending on the kind of the catalyst. When the amount of the catalyst is below 0.5%, no particle growth occurs and no desired particle size may be obtainable. Amounts thereof more than 7.5% do not affect particle growth but are not preferable from the viewpoint of cost.

In this way, silica fine particles are grown by simultaneously and consecutively adding the organic silicon compound and the hydrolysis catalyst to the dispersion solution of the silica fine particles (the solution "B"), thereby obtaining a dispersion solution of silica particles (a solution "C"). With the method described above, there can be produced the dispersion solution of silica particles having a mean particle size from 10 nm to 1 μm.

(3) Spray Drying Step

Next, granulation is performed by spray drying the silica dispersion solution (the solution "C"). The mean particle size of spray-dried silica particles (granulated particles obtained by spray drying, which are the particle aggregates of uniform silica particles) is suitably from 1 to 100 μm, and particularly preferably from 1 to 70 μm. Mean particle sizes of the spray-dried silica particles below 1 μm leads to low fluidity and thus uniform calcination cannot be performed in the calcination step. In that case, if the treatment conditions of the disintegration step remain fixed, disintegration into particles having an initial particle size is likely to be difficult to achieve. Mean particle sizes thereof exceeding 100 μm are so large that it can be difficult to disintegrate into an initial particle size in the disintegration step, and even if possible, such disintegration requires long time to be achieved. Furthermore, it is difficult to obtain disintegrated silica particles having low hygroscopicity and high dispersibility in resin.

In addition, the moisture content of the spray-dried silica particles is suitably from 0.01 to 10% by mass, and particularly preferably in a range from 0.1 to 7% by mass. It is difficult to set the moisture content to less than 0.01% by mass, and even if possible, fusion occurs in the spray drying step. Calcination of particles in the fused state can make it difficult to achieve disintegration into an initial particle size in the disintegration step. Additionally, moisture contents exceeding 10% by mass promote fusion in the calcination step, which can hinder disintegration into an initial particle size in the disintegration step.

The method for spray drying is not particularly limited as long as disintegrated silica particles described later can be finally obtained. The spray drying method that can be employed may be a conventional method, such as rotation disc method, pressurization nozzle method, or two-fluid nozzle method. Particularly, the two-fluidity nozzle method is suitable.

The temperature of hot wind in spray drying is suitably from 120 to 300° C. as an outlet temperature, and particularly preferably from 130 to 250° C. Although depending on inlet temperature, when the outlet temperature is below 120° C., granulated particles cannot be sufficiently dried. Calcination of insufficiently dried granulated particles easily causes fusion. Even if the above-described disintegration step is used, it is difficult to uniformly disintegrate fused particles. Additionally, outlet temperatures exceeding 300° C. reduce the moisture of the granulated particles but increase the fusion of particles in the calcination step, thus making it difficult to disintegrate all of the fused particles.

The concentration of the silica dispersion solution (the solution "C") used for spray drying is suitably from 1 to 40% by mass, and particularly preferably from 10 to 30% by mass. Concentrations of the silica dispersion solution (the solution "C") below 1% by mass cause productivity reduction, as well as lead to reduction in the particle size of granulated particles. In other words, since granulated particles contain a small number of silica particles gathered, fluidity of the granulated particles is reduced. In case when uniform calcination is not achieved in the calcination step, it is difficult to supply the granulated particles for the disintegration step with fixed conditions because of reduced fluidity of the granulated particles. Thereby, disintegration into an initial particle size is unlikely to be achieved. On the other hand, concentrations of the silica dispersion solution (the solution "C") exceeding 40% by mass lower the stability of the dispersion solution, thus making it difficult to obtain a particle aggregate having a uniform configuration (granulated particles). As a result, in case when calcination is not uniformly performed in the calcination step, it is difficult to supply the granulated particles for the disintegration step with fixed conditions and disintegration into an initial particle size is unlikely to be achieved in the disintegration step with the fixed conditions.

The invention has found that uniformly setting the particle sizes of spray-dried silica particles to about several ten micrometers by adjusting the concentration of the silica dispersion solution to about 20% by mass in the spray drying step significantly reduces the amount of particle fusion occurring after calcination even when calcined at from 800 to 1100° C. (see Examples 1 to 8 described later).

Furthermore, before the spray drying step and after the particle growth step described above, an aging step and a filtration step may be provided if necessary, as follows:

(Aging Step)

The dispersion solution of the silica particles (the solution "C") having passed through the particle growth step is heated to a temperature from 35 to 120° C. and stirred for a predetermined time. Then, the dispersion solution of the silica particles ages and thereby a dispersion solution of silica particles (a solution "D") is obtained. More preferably, the aging is performed in a range from 40 to 80° C. As long as the temperature of aging is in the range, it does not matter if the temperature of the dispersion (the solution "C") changes.

In addition, preferably, the pH of the dispersion solution during aging is in a range from 8 to 13. In this case, preferably, a range of pH changes in the dispersion solution is a range of ±1.0, and is more preferably controlled to be a range of ±0.5. The time of aging varies depending on the temperature but is about from 1 to 24 hours. Aging under the above conditions promotes the condensation of a hydrolysate of the organic silicon compound and allows the production of silica particles having a more uniform particle size (with a small particle size variation coefficient).

(Filtration Step)

Furthermore, a filtration step may be provided if needed, regardless of whether the above-described aging step is performed before the filtration step. Filtration allows the separation of agglomerates of silica particles larger than a predetermined mean particle size. At this point, the presence of any remaining agglomerates larger than a predetermined mean particle size leads to the generation of calcined silica particles that can hardly be disintegrated as a result of calcination in the calcination step. This is because calcined silica particles having a high degree of fusion are produced, which cause fracture within the particles even after they are followed by pulverization, resulting in breaking the siloxane bond and thereby making it likely to generate silanol groups on the fractured surface. Accordingly, the hygroscopicity of the calcined silica particles cannot be lowered. Thus, the calcination of the silica particles remaining in the state of agglomeration at this point hinders the production of disintegrated silica particles having low hygroscopicity, high dispersibility in resin, and excellent filling ability. The method for filtration is not particularly limited as long as the method can separate the agglomerates of silica particles larger than a predetermined particle size. Such agglomerates can be separated by any of conventionally known various filters. The spray drying is performed using the silica dispersion obtained after having passed through the filtration step, and then the obtained silica particles are calcined.

Silica particles supplied to the spray drying step have a mean particle size (DA) of suitably from 10 nm to 1 µm, and particularly preferably from 20 nm to 1 µm. When the mean particle size (DA) is below 10 nm, it is difficult of obtain particles having a uniform particle size, and even if possible, the particles are strongly sintered during calcination. It is thus difficult to obtain disintegrated silica particles having low hygroscopicity and high dispersibility in resin. When the mean particle size (DA) of the silica particles exceeds 1 µm, filling ability of the resin composition is reduced in the case of narrow gaps in highly integrated semiconductor elements.

The mean particle sizes of individual silica particles described in the present specification are measured by the following methods: a particle size distribution analyzer LA-950 V2 manufactured by Horiba Ltd., used for particles having a mean particle size of below 1 µm, and a Coulter Counter III manufactured by Beckman Coulter Inc., used for particles having a mean particle size of 1 µm or more.

[Resin Composition Including Disintegrated Silica Particles]

Now, a description will be given of a resin composition according to the present invention. The resin composition includes disintegrated silica particles obtained through the disintegration step described above and resin.

The resin can be appropriately selected depending on the purpose. Herein, the resin is preferably one or two or more selected from epoxy-based resins, polyimide-based resins, bismaleimide-based resins, acrylic resins, methacrylic resins, silicon-based resins, BT resins, and cyanate-based resins.

Using such a resin allows the disintegrated silica particles to be dispersed uniformly, so that a resin composition obtained has excellent injectability and filling ability even in narrow gaps. Furthermore, the resin composition is not hygroscopic even after curing, and therefore, highly reliable electronic devices and the like can be obtained.

The content of the disintegrated silica particles in the resin composition is preferably from 5 to 75% by mass, and more preferably from 10 to 70% by mass. When the content thereof in the resin composition is below 5% by mass, there are a small number of particles in the composition. Therefore, the coefficient of expansion of the resin composition does not greatly differ from that of resin compositions including resin alone. Thus, for example, cracking can occur around a bump. Contents of the disintegrated silica particles exceeding 75% by mass in the resin composition increase the viscosity of the resin composition, which can thus result in insufficient injectability, filling ability, permeability, and the like.

Examples of the hydrolyzable organic silicon compound represented by the above formula (1) include tetramethoxysilane, tetraethoxysilane, tetrapropoxysilane, tetrabutoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltriethoxysilane, butyltrimethoxysilane, isobutyltriethoxysilane, hexyltriethoxysilane, octyltriethoxysilane, decyltriethoxysilane, butyltriethoxysilane, 3-ureidoisopropylpropyltriethoxysilane, N-β(aminoethyl)γ-aminopropylmethyldimethoxysilane, N-β(aminoethyl)γ-aminopropyltrimethoxysilane, N-phenyl-γ-aminopropyltrimethoxysilane, γ-mercaptopropyltrimethoxysilane, perfluorooctylethyltrimethoxysilane, perfluorooctylethyltriethoxysilane, perfluorooctylethyltriisopropoxysilane, trifluoropropyltrimethoxysilane, tridecafluorooctyltrimethoxysilane, heptadecatrifluorodecyltrimethoxysilane, dimethoxymethyltrifluoropropylsilane, pentadecatrifluorodecyltrimethoxysilane, heptadecatrifluorodecyltripropoxysilane, trimethylsilanol, methyltrichlorosilane, 3-glycidoxypropylmethyldiethoxysilane, 3-methacryloxypropylmethyldimethoxysilane, 3-methacryloxypropylmethyldiethoxysilane, N-2-(aminoethyl)-3-aminopropylmethyldimethoxysilane, 3-mercaptopropylmethyldimethoxysilane, and mixtures including two or more of these compounds.

Hereinbelow, a description will be given of Examples of the method for producing disintegrated silica particles. The present invention is, however, not limited to the Examples.

EXAMPLES

Example 1

Preparation of Calcined Silica Particles
(Seed Particle Preparation Step)

First, water, alcohol, and a hydrolysis catalyst were mixed together to prepare a mixed solvent. In the present Example, 221.2 g of water, 185.1 g of ethyl alcohol (manufactured by Kanto Chemical Co., Inc.), and 38.1 g of ammonia water having a concentration of 28% by mass were placed in a glass reactor having a capacitor of 2 L (liter) and stirred. The temperature of the obtained solution was adjusted to 35±0.5° C., and in the reactor, 7.88 g of tetramethoxysilane (manufactured by Tama Chemicals Co., Ltd.) was added all at once, followed by stirring for 1 hour, whereby tetramethoxysilane was hydrolyzed and condensed to obtain a dispersion solution of silica fine particles (a solution "A"). In the solution "A", the silica fine particles had a mean particle size of 0.083 µm, and the standard deviation of the mean particle size was 0.072 µm.

In order to adjust the pH of the solution "A", 61.1 g of ammonia water having the concentration of 28% by mass and 10.0 g of water were added thereto, and the solution temperature was adjusted to 35±0.5° C. while stirring, thereby obtaining a dispersion solution of the silica fine particles (a solution "B"). The dispersion solution (the solution "B") had a pH of 12.2 and an electric conductivity of 196 μS/cm.

(Particle Growth Step)

In a first dropping device was placed 497.0 g of tetraethoxysilane as an organic silicon compound for particle growth, and in a second dropping device was placed ammonia water having a concentration of 8% by mass (a hydrolysis catalyst) prepared by diluting 126.0 g of ammonia water having the concentration of 28% by mass with 315.0 g of water. The tetraethoxysilane and the ammonia water were added dropwise into the dispersion solution (the solution "B") controlled to 35±0.5° C. in 12 hours by the first and the second dropping devices. The pH was maintained at values not below 11.5 during the dropping time. In addition, the electric conductivity of a dispersion solution (a solution "C") after finishing the dropping was 96.1 μS/cm, and, similarly, was not below 90 μS/cm during the dropping time.

(Aging Step)

After finishing the dropping, the solution temperature of the dispersion solution (the solution "C") was adjusted to 60±0.5° C., and the solution was stirred for 1 hour for aging to prepare a dispersion solution of silica particles (A1) (a solution "D"). In the solution "D", the silica particles (A1) had a mean particle size of 0.27 μm, and the standard deviation of the mean particle size was 0.07 μm. Additionally, the dispersion solution, at this time, had a pH of 11.7.

(Filtration Step and Step of Preparing Dispersion Solution for Spray Drying)

The dispersion solution of the silica particles (A1) (the solution "D") thus obtained was filtered through a nylon filter having a pore size of 0.5 μm to remove particle aggregates of the silica particles. Additionally, the resulting solution was replaced with an aqueous solvent using a distillator, followed by concentration to reach a silica concentration of 20% by mass, thereby obtaining a dispersion solution of the silica particles (A1) (a solution "E").

(Spray Drying Step)

The dispersion solution of the silica particles (A1) (the solution "E") was spray dried using a spray dryer (model: FOC-25, manufactured by Ohkawara Kakohki Co., Ltd.) to granulate silica powder (spray-dried silica particles). At this time, the inlet temperature and outlet temperature, respectively, of the spray dryer was 250° C. and 150° C. The silica powder had a moisture content of 7% by mass. The mean particle size of the silica particles (A1) forming the silica powder was measured, and Table 1 shows the results of the measurement.

(Calcination Step)

Next, the silica powder was placed in crucibles (calcination container) made of SiC and calcined in an electric furnace at 900° C. for 10 hours. The resulting particles were cooled to obtain calcined silica particles.

(Disintegration Step)

Subsequently, the obtained calcined silica particles were fed in a disintegration apparatus (NANO JETMIZER NJ-100, manufactured by Aishin NanoTechnologies Co., Ltd.) in which a swirling flow is generated by a high pressure gas to disintegrate the calcined silica particles, thereby obtaining disintegrated silica particles (B1). The high pressure gas used at this time was a dry air controlled to have a dew point of −10° C. under a pressure of 1.0 MPa by an air dryer. In addition, an enclosure was provided to seal an introduction inlet for the calcined silica particles, and in which the dry air having the dew point of −10° C. was introduced. The calcined silica particles were supplied from the environment with the dew point of −10° C., so that a dry air to be introduced together with the calcined silica particles was also the air with the dew point of −10° C.

Conditions for operating the present disintegration apparatus were set as follows: a disintegration pressure (a swirling flow air pressure in a disintegration section) of 0.85 MPa, a pressure of a section introducing the calcined silica particles of 1.0 MPa, a raw material introduction rate of 5 kg/Hr, a swirling rate (linear velocity) of 391 m/s, and a solid to gas ratio of 22.6 g/m$^3$. In addition, the disintegration container of the apparatus is preferably made of silicon carbide thermally treated at 900° C. or more.

The mean particle size and coefficient of particle size variation (CV value) of the obtained disintegrated silica particles (B1) were measured, and Table 2 shows the results of the measurements. Additionally, the content of coarse particles, hygroscopicity (the amount of adsorbed moisture), and the content of impurities (Fe, Zr, U, and Th) were measured to evaluate dispersibility. Table 2 shows the results of the measurements.

In addition, the resulting disintegrated silica particles (B1) is classified by Aerofine Classifier from Nisshin Engineering Inc. to provide classified silica particles having a mean particle size of 0.25 μm, a CV value of 19.0%, a coarse particles content of 0.1% by mass, an adsorbed moisture amount of 0.12% by mass, a Fe content of 0.3 ppm, a Zr content of 0.0 ppm, a U content of 0.1 ppm, a Th content of 0.0 ppm.

Measurement of Coarse Particles

When the distribution of particles having large particle sizes was observed in the measurement of the mean particle size, the percentage (weight percentage) of particles four times the mean particle size was obtained and used as the content of coarse particles.

Hygroscopicity

The disintegrated silica particles (B1) were exposed to an environment with a temperature of 25° C. and a humidity of 90%, and a mass ($W_H$) of the particles after 48 hours was measured. Then, the amount of increase from a mass ($W_D$) of the disintegrated silica particles (($W_H$)−($W_D$)) is obtained. The amount of adsorbed moisture Q (% by mass) was obtained by dividing the amount of increase by (WD).

$$Q=((W_H)-(W_D))/(W_D) \times 100 (\%).$$

A (very preferable): 0.15≥Q
B (preferable): 0.2≥Q>0.15
C: 1.0≥Q>0.2
D: 2.0≥Q>1.0

Content of Impurities

The disintegrated silica particles (B1) were pre-treated with sulfuric acid, nitric acid, and hydrofluoric acid and then dissolved in nitric acid to measure the content of impurities using an ICP mass analyzer (Model: AGILENT 7500S, manufactured by Agilent Technologies, Inc).

Evaluation of Dispersibility

A resin composition was produced in the following manner to evaluate dispersibility. An epoxyacrylate resin (3000A, manufactured by Kyoeisya Chemical Co., Ltd.) and an epoxyacrylate resin (M600A, manufactured by Kyoeisya Chemical Co., Ltd.) were mixed together in a weight ratio of 85:15 to obtain a resin. Into 25.5 g of the obtained resin was mixed 4.5 g of the disintegrated silica particles (B1). The obtained mixture was kneaded by a revolving-rotating mixer (AWATORI RENTARO AR-100, manufactured by Thinky Corporation) at 2000 rpm for 10 minutes. Next, the resulting mixture was passed through a three roll mill (EXAKT 50, manufactured by EXAKT Technologies, Inc.) one time to produce a resin composition (a paste 1). The dispersibility of the resin composition was evaluated based on the following criteria. Table 2 shows the results of the evaluation.

A: No minute particle agglomerates were observed at all.
B: Very few minute particle agglomerates were observed.
C: A small amount of minute particle agglomerates were observed.
D: Relatively large particle agglomerates were observed.

Evaluation of Injectability

A resin composition is made and evaluated for injectability, as follows. Bisphenol F Epoxy Resin (YDF8170, made by Nippon Steel& Sumikin Chemical Co., Ltd.), liquid phenol resin (MEH8000, made by Meiwa Plastic Industries, Ltd.), imidazole (2E4MZ, made by Shikoku Chemicals Corporation), and disintegrated silica particles (B1) were mixed at a ratio by weight of 31.0:19.0:0.26:50.0 and kneaded by a revolving-rotating mixer (AWATORI RENTARO AR-100, manufactured by Thinky Corporation) at 2000 rpm for 10 minutes. The resulting mixture was then passed through a triple roll mill (EXAKT 50, made by Exakt Technologies, Inc.) five times to produce 15 g of a resin composition (paste 1). The resulting resin composition was evaluated at 110° C. for the injectability. The injectability was evaluated using a piece of glass onto which a gap cover glass (CG00024) with a gap of about 20 μm, made by Matsunami Glass Ind., Ltd., was stuck, and using a resin composition from each of Examples and Comparative Examples which was evenly mounted all over the opening (the short sides of the cap cover glass) using a syringe. The mounted resin composition is heated to 110° C. to lower the viscosity, extending to the opposite side (the opening) within the gap cover glass by capillarity. Then, the injectability was evaluated based on the following criteria, the results of which are shown in Table 2.

A: No minute particle agglomerates were observed around the filling opening at all.
B: Very few minute particle agglomerates were observed around the filling opening.
C: A small amount of minute particle agglomerates were observed around the filling opening.
D: Relatively large particle agglomerates were observed around the filling opening.

Evaluation of Filterability

A resin composition was made and evaluated for the dispersibility, as follows. 51.0 g of a resin made by mixing epoxy acrylate resin (3000A, made by Kyoeisha Chemical Co., Ltd.) and epoxy acrylate resin (M600A, made by Kyoeisha Chemical Co., Ltd.) at a ratio by weight of 85:15 was mixed with 9.0 g of disintegrated silica particles (B1), and kneaded by a revolving-rotating mixer (AWATORI RENTARO AR-100, manufactured by Thinky Corporation) at 2000 rpm for 10 minutes. The resulting mixture was then passed through a triple roll mill (EXAKT 50, made by Exakt Technologies, Inc.) one time to produce a resin composition (paste 1). The resulting resin composition was loaded into a stainless steel column, and, in a heated state of 40° C., pressurized under 0.4 MPa nitrogen, and filtered through a 3 μm metal filter (Superpore A3, made by Nippon Kanaami Shoko Co., Ltd.). The resin composition was evaluated for filterability based on the following criteria, the results of which are shown in Table 2.

A: No decrease in filterability was observed at all.
B: Very little decrease in filterability was observed.
C: A small amount of decrease in filterability was observed.
D: Decrease in filterability was observed.

Example 2

The present Example provided a surface modification step after the disintegration step of Example 1. Specifically, disintegrated silica particles (B1) obtained in the disintegration step in the same manner as Example 1 were placed again in a crucible, calcined in an electric furnace at 700° C. for 10 hours, and then cooled to prepare disintegrated silica particles (B2). The obtained disintegrated silica particles (B2) were evaluated in the same manner as in Example 1. Table 2 shows the results of the evaluation.

Example 3

The present Example is different from Example 2 in terms of the size of the obtained silica particles. First, as in Example 1, a dispersion solution of silica fine particles (a solution "A3") was produced, followed by concentration to give a silica concentration of 20% by mass. Then, in a glass reactor having a capacity of 2 L were placed 26.9 g of the dispersion solution of the silica fine particles (the solution "A3"), 125.5 g of water, 136.0 g of ethyl alcohol, and 92.5 g of ammonia water having the concentration of 28% by mass. The temperature of the mixed solution was adjusted to 35±0.5° C. while stirring, obtaining a dispersion solution (a solution "B3").

In a first dropping device was placed 702.0 g of tetraethoxysilane for particle growth and in a second dropping device was placed ammonia water having a concentration of 8% by mass prepared by diluting 183.0 g of ammonia water having the concentration of 28% by mass with 458.0 g of water. The tetraethoxysilane and the ammonia water having the ammonia water having the concentration of 8% by mass were added dropwise in the dispersion solution (the solution "B3") controlled to 35±0.5° C. in 19 hours from the respective dropping devices.

After finishing the dropping, the solution temperature was adjusted to 60±0.5° C., and the solution was stirred for 1 hour. As a result, hydrolysis and condensation of the tetraethoxysilane were performed to obtain a dispersion solution of the silica particles (a solution "D3"). In the solution "D3", the silica particles (A3) had a mean particle size of 0.96 μm, and the standard deviation of the mean particle size was 0.22 μm.

The dispersion solution (the solution "D3") was filtered through a nylon filter with a pore size of 2.0 μm, replaced with an aqueous solvent using a distillator, and then concentrated to give a silica concentration of 35% by mass, thereby obtaining a concentrated dispersion solution (a solution "E3").

As in Example 1, the dispersion solution (the solution "E3") was spray dried and granulated by a spray dryer, and calcined at 900° C. in an electric furnace, followed by disintegration using the NANOJETMIZER. In addition, surface modification was performed as in Example 2 to obtain disintegrated silica particles (B3). Table 1 shows an outline of conditions for producing the disintegrated silica particles (B3). Characteristic properties of the disintegrated silica particles (B3) were evaluated as in Example 1. Table 2 shows the results of the evaluation.

Example 4

The present Example is different from Example 2 in terms of calcination conditions. Specifically, in the calcination step of the present Example, silica particles were calcined at 800° C. for 10 hours. The other conditions were the same as those in Example 2. In this way, disintegrated silica particles (B4) were produced. Table 1 shows an outline of the conditions for producing the disintegrated silica particles (B4). Characteristic properties of the disintegrated silica particles (B4) were evaluated as in Example 1. Table 2 shows the results of the evaluation.

Example 5

In the present Example, the calcination step performed calcination at 1100° C. for 10 hours. The other conditions were the same as those in Example 2. In this way, disintegrated silica particles (B5) were produced. Table 1 shows an outline of the conditions for producing the disintegrated silica particles (B5). Characteristic properties of the disintegrated silica particles (B5) were evaluated as in Example 1. Table 2 shows the results of the evaluation.

Example 6

The present Example is different from Example 2 in terms of high pressure gas used in the disintegration step. The present Example used a dry air having a dew point of −20° C. under the pressure of 1.0 MPa, as the high pressure gas generating a swirling flow. Then, disintegrated silica particles (B6) were produced in the same manner as in Example 2, except for the above condition of the gas. Table 1 shows an outline of the conditions for producing the disintegrated silica particles (B6). Characteristic properties of the disintegrated silica particles (B6) were evaluated as in Example 1. Table 2 shows the results of the evaluation.

Example 7

The present Example is different from Example 2 in terms of a calcination condition in the surface modification step. The present Example performed calcination at 600° C. for 10 hours and produced disintegrated silica particles (B7) in the same conditions as those in Example 2 except for the calcination condition mentioned above. Table 1 shows an outline of the conditions for producing the disintegrated silica particles (B7). Characteristic properties of the disintegrated silica particles (B7) were evaluated as in Example 1. Table 2 shows the results of the evaluation.

Example 8

The present Example is different from Example 2 in terms of a calcination condition in the surface modification step. The present Example performed calcination at 1000° C. for 10 hours in the surface modification step and produced disintegrated silica particles (B8) in the same conditions as those in Example 2 except for the calcination condition mentioned above. Table 1 shows an outline of the conditions for producing the disintegrated silica particles (B8). Characteristic properties of the disintegrated silica particles (B8) were evaluated as in Example 1. Table 2 shows the results of the evaluation.

Example 9

The present Example is different from Example 1 in terms of a disintegration condition in the disintegration step. For this example, in the disintegration step, the disintegration pressure was set to 0.85 MPa, the pressure at a section introducing the calcined silica particles to 1.0 MPa, the raw material introduction rate to 1.8 kg/Hr, the swirling flow rate (linear velocity) to 391 m/s, and the solid to gas ratio to 8.1 g/m$^3$. Table 1 shows an outline of the conditions for producing the disintegrated silica particles (B9). Characteristic properties of the disintegrated silica particles (B9) were evaluated as in Example 1. Table 2 shows the results of the evaluation.

Example 10

In this Example, the disintegration step of Example 9 was followed by a surface modification step. In other words, the disintegrated silica particles (B9) obtained in the disintegration step in the same manner as in Example 9 were placed in the calcination container again, calcined at 700° C. for 10 hours using an electric furnace, and cooled to prepare disintegrated silica particles (B10). The resulting disintegrated silica particles (B10) were evaluated in the same manner as in Example 1. Table 2 shows the results of the evaluation.

Comparative Example 1

For this comparative example, a disintegration step was not performed. The calcined silica particles (R1) obtained by the calcination step in Example 1 were evaluated in the same manner as in Example 1. Table 2 shows the results of the evaluation. However, due to excessively large size of the calcined silica particles (R1), the preparation of a resin composition and the evaluation of dispersibility were not performed.

Comparative Example 2

In the present Comparative Example, the calcination conditions of the calcination step of Example 1 were set to 550° C. and 10 hours. Disintegrated silica particles (R2) were produced in the same conditions as those in Example 1 except for the above conditions. Characteristic properties of the disintegrated silica particles (R2) were evaluated as in Example 1. Table 2 shows the results of the evaluation.

Comparative Example 3

The present Comparative Example is an Example in which the calcination conditions of the calcination step of Example 2 were set to 1250° C. and 10 hours. Disintegrated silica particles (R3) were produced in the same conditions as those in Example 2 except for the above calcination conditions. Characteristic properties of the disintegrated silica particles (R3) were evaluated as in Example 1. Table 2 shows the results of the evaluation.

Comparative Example 4

In the present Comparative Example, the order of the calcination step and the disintegration step in Example 1 was switched. Specifically, the process from the seed particle preparation step to the spray drying step was performed as in Example 1 to granulate silica powder. Next, the silica powder was disintegrated by the NANOJETMIZER (NJ-100 manufactured by Aishin Nano Technologies Co., Ltd.) as in the disintegration step of Example 1. In other words, the silica powder was fed in a swirling flow generated by a high pressure gas having low humidity and disintegrated therein. Then, the disintegrated silica powder was placed in a calcination container and calcined in an electric furnace at 900° C. for 10 hours, followed by cooling to produce disintegrated silica particles (R4). Characteristic properties of the disintegrated silica particles (R4) were evaluated as in Example 1. Table 2 shows the results of the evaluation.

Comparative Example 5

The present Comparative Example performed a surface modification step after the production step described in Comparative Example 4. Specifically, the disintegrated silica particles (R4) produced as in Example 4 were placed in a calcination container and calcined in an electric furnace at 700° C. for 10 hours, followed by cooling to obtain disintegrated silica particles (R5). Characteristic properties of the disintegrated silica particles (R5) were evaluated as in Example 1. Table 2 shows the results of the evaluation.

Comparative Example 6

The present Comparative Example performed the disintegration step of Example 1 using a pulverizer (MICRON JET MJT, manufactured by Hosokawa Micron Corporation). Specifically, the process until the calcination step was performed as in Example 1 to produce calcined silica particles. Then, the produced calcined silica particles were pulverized by the pulverizer (MICRON JET MJT, manufactured by Hosokawa Micron Corporation) to obtain disintegrated silica particles (R6). The pulverizer is not a swirling flow type disintegration apparatus but a disintegration apparatus of a type that causes particles to collide with a target made of zirconia.

Characteristic properties of the disintegrated silica particles (R6) were evaluated as in Example 1. Table 2 shows the results of the evaluation.

TABLE 1

Preparation of disintegrated silica particles

| | Silica particles (A) | | Spray drying (step) | | | | Disintegration (step) | | | | | | Surface modification (step) | |
|---|---|---|---|---|---|---|---|---|---|---|---|---|---|---|
| | Mean particle size μm | Concentration of dispersion solution % by mass | Inlet temperature ° C. | Outlet temperature ° C. | Moisture content % by mass | Mean particle size μm | Calcination (step) Temperature ° C. | Time h | Introduced gas Dew point ° C. | Pressure of introduction MPa | Linear velocity m/s | solid to gas ratio g/m³ | Temperature | Time |
| Ex. 1 | 0.27 | 20 | 250 | 150 | 7.0 | 40 | 900 | 10 | −10 | 0.85 | 391 | 22.6 | — | — |
| Ex. 2 | 0.27 | 20 | 250 | 150 | 7.0 | 40 | 900 | 10 | −10 | 0.85 | 391 | 22.6 | 700 | 10 |
| Ex. 3 | 0.96 | 35 | 250 | 150 | 7.0 | 40 | 900 | 10 | −10 | 0.85 | 391 | 22.6 | 700 | 10 |
| Ex. 4 | 0.27 | 20 | 250 | 150 | 7.0 | 40 | 800 | 10 | −10 | 0.85 | 391 | 22.6 | 700 | 10 |
| Ex. 5 | 0.27 | 20 | 250 | 150 | 7.0 | 40 | 1100 | 10 | −10 | 0.85 | 391 | 22.6 | 700 | 10 |
| Ex. 6 | 0.27 | 20 | 250 | 150 | 7.0 | 40 | 900 | 10 | −20 | 0.85 | 391 | 22.6 | 700 | 10 |
| Ex. 7 | 0.27 | 20 | 250 | 150 | 7.0 | 40 | 900 | 10 | −10 | 0.85 | 391 | 22.6 | 600 | 10 |
| Ex. 8 | 0.27 | 20 | 250 | 150 | 7.0 | 40 | 900 | 10 | −10 | 0.85 | 391 | 22.6 | 1000 | 10 |
| Ex. 9 | 0.27 | 20 | 250 | 150 | 7.0 | 40 | 900 | 10 | −10 | 0.85 | 391 | 8.1 | — | — |
| Ex. 10 | 0.27 | 20 | 250 | 150 | 7.0 | 40 | 900 | 10 | −10 | 0.85 | 391 | 8.1 | 700 | 10 |
| CompEx. 1 | 0.27 | 20 | 250 | 150 | 7.0 | 40 | 900 | 10 | — | — | — | — | — | — |
| CompEx. 2 | 0.27 | 20 | 250 | 150 | 7.0 | 40 | 550 | 10 | −10 | 0.85 | 391 | 22.6 | — | — |
| CompEx. 3 | 0.27 | 20 | 250 | 150 | 7.0 | 40 | 1250 | 10 | −10 | 0.85 | 391 | 22.6 | 700 | 10 |
| CompEx. 4 | 0.27 | 20 | 250 | 150 | 7.0 | 40 | 900 | 10 | −10 | 0.85 | 391 | 22.6 | — | — |
| CompEx. 5 | 0.27 | 20 | 250 | 150 | 7.0 | 40 | 900 | 10 | −10 | 0.85 | 391 | 22.6 | 700 | 10 |
| CompEx. 6 | 0.27 | 20 | 250 | 150 | 7.0 | 40 | 900 | 10 | Non-swirling flow type | | | | — | — |

TABLE 2

| | Disintegrated silica particles | | | | | | | | Resin composition | | | |
|---|---|---|---|---|---|---|---|---|---|---|---|---|
| | Mean particle size μm | CV value % | Coarse particles Content % by mass | Amount of adsorbed moisture % by mass | Content of impurities Fe ppm | Zr ppm | U ppb | Th ppb | Resin content % by mass | Dispersibility | Filterability | Injectability |
| Ex. 1 | 0.26 | 21.0 | 0.2 | 0.12 | 0.2 | 0.0 | 0.1 | 0.0 | 85 | A | B | B |
| Ex. 2 | 0.26 | 22.0 | 0.3 | 0.10 | 0.2 | 0.0 | 0.1 | 0.0 | 85 | A | A | A |
| Ex. 3 | 0.94 | 16.0 | 0.1 | 0.08 | 0.5 | 0.0 | 0.2 | 0.0 | 85 | A | A | A |
| Ex. 4 | 0.27 | 21.5 | 0.2 | 0.25 | 0.2 | 0.0 | 0.1 | 0.0 | 85 | B | B | B |
| Ex. 5 | 0.25 | 35.0 | 0.4 | 0.02 | 0.3 | 0.0 | 0.2 | 0.0 | 85 | C | C | C |
| Ex. 6 | 0.26 | 21.0 | 0.3 | 0.10 | 0.2 | 0.1 | 0.2 | 0.0 | 85 | A | A | A |
| Ex. 7 | 0.27 | 23.0 | 0.3 | 0.12 | 0.2 | 0.0 | 0.2 | 0.0 | 85 | B | B | B |
| Ex. 8 | 0.25 | 32.0 | 0.3 | 0.02 | 0.2 | 0.0 | 0.1 | 0.0 | 85 | B | B | B |
| Ex. 9 | 0.26 | 19.0 | 0.1 | 0.10 | 0.2 | 0.0 | 0.1 | 0.0 | 85 | A | A | A |
| Ex. 10 | 0.26 | 20.0 | 0.2 | 0.09 | 0.2 | 0.0 | 0.1 | 0.0 | 85 | A | A | A |
| CompEx. 1 | 52 | 53.0 | 0.7 | 0.10 | 0.2 | 0.0 | 0.1 | 0.0 | — | — | — | — |
| CompEx. 2 | 0.26 | 22.5 | 0.2 | 10.5 | 0.2 | 0.0 | 0.1 | 0.0 | 85 | C | D | C |

TABLE 2-continued

| | Disintegrated silica particles | | | | | | | | Resin composition | | | |
| | Mean particle size μm | CV value % | Coarse particles Content % by mass | Amount of adsorbed moisture % by mass | Content of impurities | | | | Resin content % by mass | Dispersibility | Filter-ability | Inject-ability |
| | | | | | Fe ppm | Zr ppm | U ppb | Th ppb | | | | |
|---|---|---|---|---|---|---|---|---|---|---|---|---|
| CompEx. 3 | 1.7 | 50.0 | 0.6 | 0.01 | 0.2 | 0.0 | 0.1 | 0.0 | 85 | D | D | D |
| CompEx. 4 | 2.5 | 52.0 | 0.8 | 0.13 | 0.3 | 0.0 | 0.1 | 0.0 | 85 | D | D | D |
| CompEx. 5 | 2.8 | 55.0 | 0.8 | 0.12 | 0.3 | 0.0 | 0.1 | 0.0 | 85 | D | D | D |
| CompEx. 6 | 0.28 | 40.0 | 0.6 | 0.12 | 110 | 170 | 1.8 | 0.8 | 85 | C | D | C |

Example 11

The present Example is different from Example 1 in terms of process from the calcination step and thereafter. First, the process from the seed particle preparation step to the spray drying step was performed as in Example 1, whereby silica powder was obtained.
(Calcination Step)
Next, the obtained silica powder was placed in a calcination container and heated up to 350° C. from room temperature in an electric furnace (manufactured by Murao Denki Kogyo K.K.) in 3 hours. In the present Example, each single calcination container contained 0.9 kg of silica powder, and 115 calcination containers were placed in the electric furnace with a capacity of 0.8 m³. After retaining the crucibles at 350° C. for 2 hours, water was supplied so that the amount of water vapor in the electric furnace reached 100 g/m³. Then, in that state, 11 hours were taken to increase the temperature up to 900° C., and calcination of silica powder was performed at 900° C. for 10 hours. After finishing the calcination (after the passage of 10 hours), the heater was turned off, the water supply was stopped, and nitrogen gas was introduced in the furnace at a rate of 90 L/min. The calcination containers were left intact and cooled down to 500° C. in 19 hours, and then the door of the electric furnace was opened to cool them down to 50° C. in 6 hours. After that, the introduction of the nitrogen gas was stopped and the calcination containers were taken out from the electric furnace to obtain calcined silica particles (a calcined body of silica particles).
(Disintegration Step)
Next, the calcined body of the silica particles was placed in a disintegration apparatus to disintegrate the calcined body thereof, obtaining disintegrated silica particles. Measurements were performed on the mean particle size and coefficient of particle size variation (CV value) of the obtained disintegrated silica particles. Table 3 shows the results.
In addition, the hygroscopicity of the disintegrated silica particles was evaluated based on the following method and criteria. Table 3 shows the results of the evaluation. The disintegrated silica particles were exposed to an environment with a temperature of 25° C. and a humidity of 90%, and a mass ($W_H$) of the particles after 48 hours was measured. Then, the amount of increase from a mass ($W_D$) of the disintegrated silica particles (($W_H$)−($W_D$)) is obtained. The amount of adsorbed moisture Q (% by mass) was obtained by dividing the amount of increase by ($W_D$).

$$Q=((W_H)-(W_D))/(W_D)\times100(\%).$$

The obtained amount of adsorbed moisture Q was used as a basis for the evaluation.

A (preferable): $0.15 \geq Q$
B (a little preferable): $0.2 \geq Q > 0.15$
C (not preferable): $Q > 0.2$
Preparation of Resin Composition (Paste)
An epoxyacrylate resin (3000A, manufactured by Kyoeisya Chemical Co., Ltd.) and an epoxyacrylate resin (M600A, manufactured by Kyoeisya Chemical Co., Ltd.) were mixed together in a weight ratio of 85:15 to prepare a resin. Into 25.5 g of the prepared resin was mixed 4.5 g of the above disintegrated silica particles. The mixture was kneaded by a revolving-rotating mixer (AWATORI RENTARO AR-100, manufactured by Thinky Corporation) at 2000 rpm for 10 minutes. Next, the resulting mixture was passed through the three roll mill (EXAKT 50, manufactured by EXAKT Technologies, Inc.) one time to prepare a resin composition.
Evaluation of Dispersibility
The dispersibility of the disintegrated silica particles in the obtained resin composition was evaluated in the same manner as in Example 1. Table shows the results of the evaluation.

Example 12

The present Example produced disintegrated silica particles in the same conditions as those in Example 11, except for setting to an amount of water vapor of 700 g/m³, 900° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 13

The present Example produced disintegrated silica particles in the same conditions as in Example 11, except for setting to an amount of water vapor of 2000 g/m³, 900° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 14

The present Example produced disintegrated silica particles in the same conditions as in Example 11, except for setting to an amount of water vapor of 2000 g/m³, 800° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 15

The present Example produced disintegrated silica particles in the same conditions as in Example 11, except for setting to an amount of water vapor of 100 g/m³, 800° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 16

The present Example produced disintegrated silica particles in the same conditions as in Example 11, except for setting to an amount of water vapor of 100 g/m³, 1000° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 17

The present Example produced disintegrated silica particles in the same conditions as in Example 11, except for setting to an amount of water vapor of 2000 g/m³, 1000° C., and 10 hours in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 18

The present Example produced disintegrated silica particles in the same conditions as in Example 11, except for using a 5-L rotational calcination furnace as the calcination apparatus and setting to an amount of water vapor of 2000 g/m³, 900° C., and 1 hour in the calcination step of Example 11. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Comparative Example 19

The present Example produced disintegrated silica particles in the same conditions as in Example 11, except for setting to an amount of water vapor of 10 g/m³ in the calcination step of Example 11. Introduction of an air with a temperature of 24° C. and a humidity of 45% in the furnace resulted in the generation of the amount of water vapor of about 10 g/m³. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 20

The present Example produced disintegrated silica particles in the same conditions as in Example 19, except for setting to a calcination temperature of 800° C. in the calcination step of Example 19. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 21

The present Example produced disintegrated silica particles in the same conditions as in Example 19, except for setting to a calcination temperature of 1000° C. in the calcination step of Example 19. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

Example 22

The present Example produced disintegrated silica particles in the same conditions as in Example 19, except for using a capacity of 5 liters rotational calcination furnace as the calcination apparatus and setting to 900° C. and 1 hour in the calcination step of Example 19. Measurements were performed on the mean particle size and coefficient of particle size variation (CV value) of the obtained disintegrated silica particles, whereby the hygroscopicity and dispersibility of the particles were evaluated as in Example 11. Table 3 shows the results of the evaluation.

TABLE 3

| | Calcination conditions | | | | disintegrated silica particles | | | | Resin composition | |
|---|---|---|---|---|---|---|---|---|---|---|
| | Amount of water vapor (g/m³) | Calcination temperature ° C. | Calcination time h | Calcination method | Mean particle size μm | CV value % | hygro-scopicity | Paste dispersibility | Filter-ability | Inject-ability |
| Ex. 11 | 100 | 900 | 10 | Batch | 0.23 | 3 | A | A | A | A |
| Ex. 12 | 700 | 900 | 10 | Batch | 0.23 | 4 | A | A | A | A |
| Ex. 13 | 2000 | 900 | 10 | Batch | 0.22 | 5 | A | A | A | A |
| Ex. 14 | 2000 | 800 | 10 | Batch | 0.23 | 4 | A | A | A | A |
| Ex. 15 | 100 | 800 | 10 | Batch | 0.24 | 3 | A | B | B | B |
| Ex. 16 | 100 | 1000 | 10 | Batch | 0.22 | 5 | A | A | A | A |

TABLE 3-continued

| | Calcination conditions | | | | disintegrated silica particles | | | | Resin composition | |
|---|---|---|---|---|---|---|---|---|---|---|
| | Amount of water vapor (g/m³) | Calcination temperature ° C. | Calcination time h | Calcination method | Mean particle size μm | CV value % | hygro-scopicity | Paste dispersibility | Filter-ability | Inject-ability |
| Ex. 17 | 2000 | 1000 | 10 | Batch | 0.21 | 5 | A | A | A | A |
| Ex. 18 | 2000 | 900 | 1 | Rotation | 0.23 | 2 | A | A | A | A |
| Ex. 19 | 10 | 900 | 10 | Batch | 0.23 | 7 | A | B | B | B |
| Ex. 20 | 10 | 800 | 10 | Batch | 0.24 | 6 | A | B | B | B |
| Ex. 21 | 10 | 1000 | 10 | Batch | 0.22 | 8 | A | B | B | B |
| Ex. 22 | 10 | 900 | 1 | Rotation | 0.23 | 6 | A | B | B | B |

The invention claimed is:

1. A method for producing disintegrated silica particles, comprising:
a calcination step of producing calcined silica particles by calcining silica particles in a range from 600 to 1200° C.; and
a disintegration step of producing disintegrated silica particles by supplying the calcined silica particles in a swirling flow generated by a gas introduced in a disintegration container,
wherein in the disintegration step a solid to gas ratio W1/W2 which is a ratio between a supply amount W1 (g/Hr) of the calcined silica particles supplied into the swirling flow to a supply amount W2 (m³/Hr) of the introduced gas is in a range of 4.4 to 36.3 g/m³.

2. The method for producing disintegrated silica particles according to claim 1, wherein the gas has a dew point of 0° C. or less.

3. The method for producing disintegrated silica particles according to claim 1, wherein the gas has a pressure in a range from 0.1 to 1.5 MPa at an introduction section of the disintegration container.

4. The method for producing disintegrated silica particles according to claim 1, wherein a surface modification step of performing heating treatment in a temperature range from 500 to 1100° C. is provided after the disintegration step.

5. The method for producing disintegrated silica particles according to claim 4, wherein the surface modification step is performed in a gas atmosphere having a dew point of 0° C. or less.

6. The method for producing disintegrated silica particles according to claim 1, wherein between the calcination step and the disintegration step, the silica particles calcined in the calcination step is cooled in a gas atmosphere having a dew point of 0° C. or less.

7. The method for producing disintegrated silica particles according to claim 1, wherein the silica particles calcined in the calcination step are supplied into the disintegration container through an introduction inlet provided on the disintegration container; the introduction inlet and a storage unit for the calcined silica particles are in a single sealed space; and the sealed space is filled with the gas.

8. The method for producing disintegrated silica particles according to claim 1, wherein an inner surface of the disintegration container is made of silicon carbide (SiC).

9. The method for producing disintegrated silica particles according to claim 8, wherein the silicon carbide has been calcined at 900° C. or more.

10. The method for producing disintegrated silica particles according to claim 1, wherein the silica particles are spray-dried silica particles obtained by spray drying a dispersion solution of silica particles having a mean particle size ranging from 10 nm to 1 μm; the spray-dried silica particles have a mean particle size ranging from 1 to 100 μm and having a moisture content ranging from 0.01 to 10% by mass; and
the calcined silica fine particles obtained by the disintegration step have a mean particle size ranging from 5 nm to 0.95 μm.

11. The method for producing disintegrated silica particles according to claim 1, wherein the silica particles used in the calcination step are silica particles obtained by hydrolysis of a hydrolyzable organic silicon compound represented by the following formula (1) and then particle growth,

$$R_n\text{—}SiX_{4-n} \qquad (1)$$

(wherein each R represents a substituted or unsubstituted hydrocarbon group having 1 to 10 carbon atoms and may be the same as or different from each other; X represents an alkoxy group having 1 to 4 carbon atoms, a hydroxyl group, halogen, or hydrogen; and n represents an integer from 0 to 3).

12. The method for producing disintegrated silica particles according to claim 11, wherein, in the preparation of the silica particles, the dispersion solution has a pH from 8 to 13 during the hydrolysis and has a pH from 8 to 13 during the particle growth, in which a range of pH changes of the dispersion solution is a range of ±1.0.

13. A method for producing disintegrated silica particles comprising:
a calcination step of producing calcined silica particles by calcining silica particles in a range from 800 to 1000° C. in an environment having an absolute humidity of 50 g/m³ or more; and
a disintegration step of producing disintegrated silica particles by supplying the calcined silica particles in a swirling flow generated by a gas introduced in a disintegration container.

14. The method for producing disintegrated silica particles according to claim 13, wherein, in the calcination step, the silica particles are calcined in a furnace filled with a gas containing water vapor in an amount from 100 g/m³ to 2000 g/m³.

15. The method for producing disintegrated silica particles according to claim 14, wherein after the calcination step, an inert gas having a dew point of 0° C. or less is injected into the furnace to discharge the gas containing the water vapor.

16. The method for producing disintegrated silica particles according to claim 14, wherein after the calcination step, a cooling step is provided to cool the silica particles down to 50° C. in the furnace, and in the cooling step, the gas containing the water vapor in the furnace is replaced by an inert gas having a dew point of 0° C. or less.

17. A method for producing disintegrated silica particles, comprising:
- a calcination step of producing calcined silica particles by calcining silica particles in a range from 600 to 1000° C.;
- a disintegration step of obtaining disintegrated silica particles by generating a swirling flow by a gas introduced in a disintegration container, supplying the calcined silica particles in the swirling flow, and disintegrating the calcined silica particles; and
- a surface modification step of heating the disintegrated silica particles in a temperature range from 800 to 1100° C. and obtaining surface-modified disintegrated silica particles,
- wherein in the disintegration step a solid to gas ratio W1/W2 which is a ratio between a supply amount W1 (g/Hr) of the calcined silica particles supplied into the swirling flow to a supply amount W2 ($m^3$/Hr) of the introduced gas is in a range of 4.4 to 36.3 g/$m^3$.

* * * * *